(12) United States Patent
Ting et al.

(10) Patent No.: US 9,068,712 B2
(45) Date of Patent: Jun. 30, 2015

(54) VEHICULAR LED LAMP

(71) Applicants: Hing-Hung Ting, Tainan (TW);
Yao-Yuan Kuo, Tainan (TW)

(72) Inventors: Hing-Hung Ting, Tainan (TW);
Yao-Yuan Kuo, Tainan (TW)

(73) Assignee: MIN HSIANG CORPORATION, Tainan (TW)

( * ) Notice: Subject to any disclaimer, the term of this patent is extended or adjusted under 35 U.S.C. 154(b) by 0 days.

(21) Appl. No.: 14/055,642

(22) Filed: Oct. 16, 2013

(65) Prior Publication Data

US 2015/0103550 A1 Apr. 16, 2015

(51) Int. Cl.
*F21V 7/00* (2006.01)
*F21S 8/10* (2006.01)

(52) U.S. Cl.
CPC .................................. *F21S 48/1317* (2013.01)

(58) Field of Classification Search
CPC ...................................................... F21S 48/1317
USPC .................. 362/487, 509, 516, 538, 543, 545
See application file for complete search history.

*Primary Examiner* — Meghan Dunwiddie (57) ABSTRACT

A vehicular light-emitting diode lamp includes a housing having a compartment receiving a reflective member including first and reflective surfaces and a partitioning section between the first and second reflective surface. The partitioning section includes two lateral portions respectively engaged with two mounting portions of the housing. A lamp seat is mounted in front of the partitioning section of the reflective member. First and second LED modules are mounted to the lamp seat and are electrically connected to a circuit board unit. The first LED module emits light beams towards a rear and a side of the first reflective surface. The second LED module emits light beams towards a rear and a side of the second reflective surface. Light beams emitted by the first and second LED modules transmit are reflected by the first and second reflective surfaces and then transmit cover in front of the reflective member.

7 Claims, 7 Drawing Sheets

PRIOR ART
FIG.7

VEHICULAR LED LAMP

BACKGROUND OF THE INVENTION

The present invention relates to a vehicular light-emitting diode (LED) lamp and, more particularly, to a vehicular light-emitting diode lamp capable of accurately outputting a predetermined lighting pattern while having wider applications and enhanced heat dissipating effect.

Vehicular lamps have been developed from conventional halogen lamps to high-intensity discharge (HID) lamps and then to LED lamps. LED lamps for vehicles do not include stabilizers required in HID lamps and consume less energy while having the advantages of small volume, light weight, high on/off speed, excellent resistance to vibration, and long service life.

Figure 7:
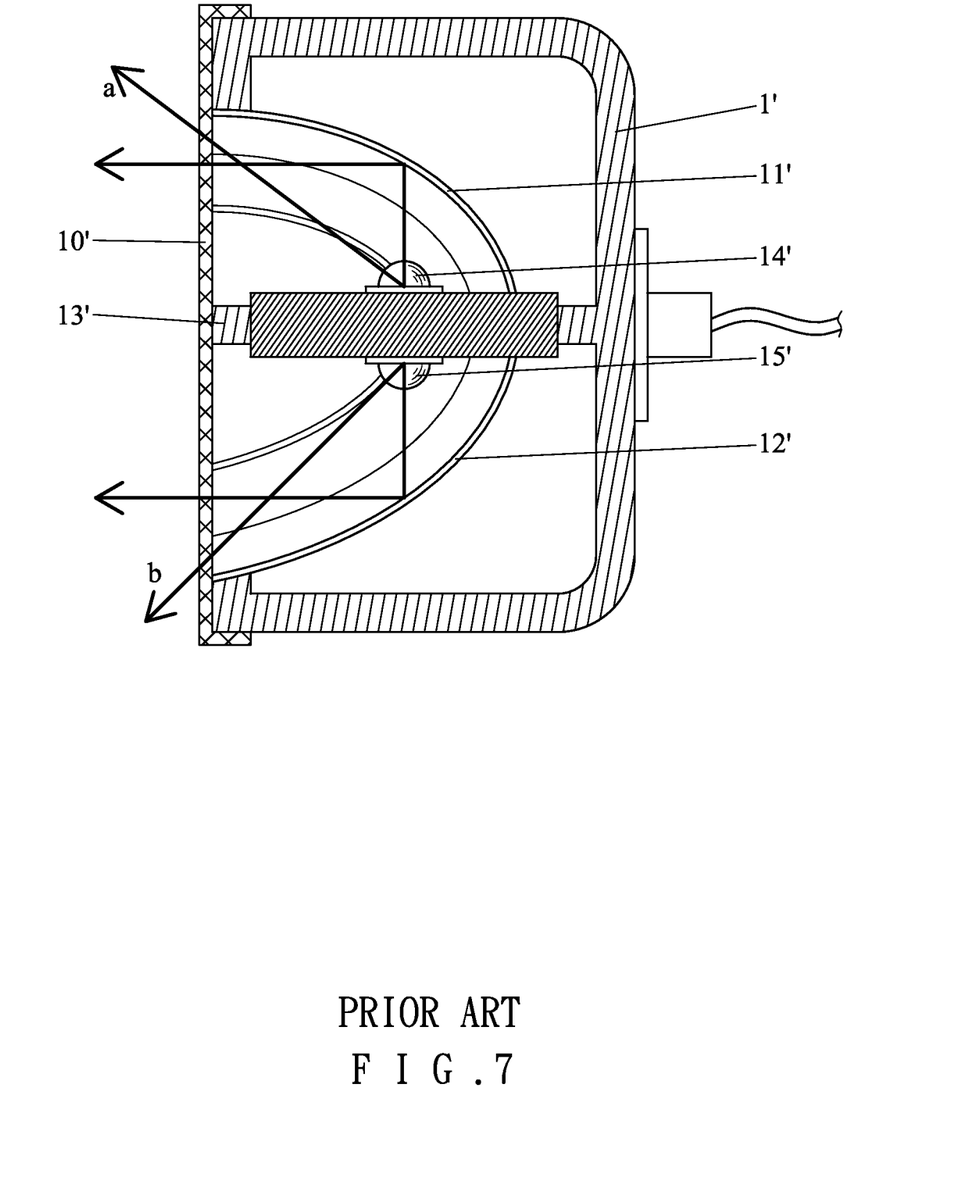
FIG. 7 is a cross sectional view of a conventional vehicular lamp.

LED lamps for vehicles have been used as vehicle headlights to provide high beam and low beam. FIG. 7 shows a conventional vehicular LED lamp providing two beams in two different directions. The LED lamp includes a lamp casing 1' and a transparent cover 10'. The lamp casing 1' includes two reflective portions 11' and 12' in a central portion thereof and a partitioning plate 13' located between the reflective portions 11' and 12' and extending perpendicularly to the cover 10'. Two LED light sources 14' and 15' are provided on two sides of the partitioning plate 13'. Light beams emitted by the LED light sources 14' and 15' are reflected by the reflective portions 11' and 12' and then transmit the cover 10' to provide high beam or low beam due to provisions of the reflective surfaces on the reflective portions 11' and 12'. Such an LED lamp is disclosed in U.S. Patent Publication No. 2009/0097247.

Since the LED light sources 14' and 15' are arranged in a direction parallel to the extending direction of the cover 10', a portion of the light beams emitted from the LED light sources 14' and 15' directly transmits the cover 10' without reflection by the reflective portions 14' and 15' (see light beams a and b in FIG. 7), failing to effectively control the outputted lighting pattern. Furthermore, the temperatures of the LED light sources 14' and 15' affect each other, resulting in high heat and a low heat dissipating effect.

BRIEF SUMMARY OF THE INVENTION

An objective of the present invention is to provide a vehicular light-emitting diode lamp capable of accurately outputting a predetermined lighting pattern while having wider applications and enhanced heat dissipating effect.

A vehicular light-emitting diode lamp according to the present invention includes a housing having a compartment in a central portion thereof. The compartment has an opening in a front end of the housing. A recessed portion extends rearward from a bottom wall of the compartment. First and second mounting portions extend from the bottom wall to the opening of the compartment and are located on opposite sides of the recessed portion. A reflective member is mounted in the compartment of the housing. The reflective member includes a concave inner side having an opening in a front end of the reflective member. The concave inner side of the reflective member includes first and reflective surface having different reflecting conditions. The reflective member further includes a partitioning section located between the first and second reflective surfaces. The partitioning section includes first and second lateral portions respectively engaged with the first and second mounting portions of the housing. The partitioning section further includes a central portion between the first and second lateral portions of the partitioning section. A cover is mounted in front of the opening of the reflective member and is transmittable to light. A circuit board unit is mounted in the housing and is adapted to be electrically connected to an external electric component. A lamp seat is mounted in front of the partitioning section of the reflective member. The lamp seat includes two sides each having a transverse coupling portion. The transverse coupling portions are respectively located in front of the first and second lateral portions. The lamp seat further includes two vertical coupling portions between the transverse coupling portions. Each vertical coupling portion includes an engagement section. The engagement sections respectively face the first and second reflective surfaces of the reflective member. First and second light-emitting diode (LED) modules are respectively mounted to the engagement sections of the lamp seat. The first LED module includes an ELD adapted to emit light beams towards a rear and a side of the first reflective surface. The second LED module includes an LED adapted to emit light beams towards a rear and a side of the second reflective surface. The first and second LED modules are electrically connected to the circuit board unit.

Preferably, each of the first and second mounting portions of the housing includes a fixing hole. The housing further includes a plurality of fins on an outer side thereof. Each of the first and second lateral portions of the partitioning section of the reflective member includes a through-slot. Each transverse coupling portion has a projection protruding rearward from a rear face of the transverse coupling portion. Each projection includes a fixing hole aligned with the fixing hole of one of the first and second lateral portions of the partitioning section of the reflective member. The projection of each transverse coupling portion engages with the through-slot of one of the first and second lateral portions of the partitioning section of the reflective member, with each projection abutting one of the first and second mounting portions of the housing. A fastener extends through the fixing hole of the lamp seat and the fixing hole of the housing.

Preferably, the first and second mounting portions of the housing are located on the same horizontal line.

Preferably, the housing includes an engagement groove, a notch, and a lug at the opening of the housing. The notch is located on an inner side of the engagement groove. The reflective member includes an ear on an outer side of the opening of the reflective member. The ear of the reflective member engages with the notch of the housing. The cover includes a lip engaged in the engagement groove of the housing. The cover further includes a coupling member engaged with the lug of the housing.

Preferably, each of the two vertical coupling portions of the lamp seat includes a front face having a decorative pattern.

Preferably, the central portion of the reflective member is aligned with the recessed portion of the housing. The central portion of the reflective member extends from a bottom of the reflective member to the opening of the reflective member. The central portion of the reflective member includes a slot. The circuit board unit is received in the recessed portion of the housing and the slot of the reflective member.

Preferably, the first LED module includes a shield adapted to block light beams emitted from the LED of the first LED module towards the partitioning section of the reflective member.

When the first and second LED modules operate, the LED of the first LED module emits light beams towards the rear and the side of the first reflective surface, and the LED of the second LED module emits light beams towards the rear and the side of the second reflective surface. The light beams are reflected by the first and second reflective surfaces to produce high beam or low beam. The front ends of the LEDs are directly blocked by the lamp seat such that the light beams emitted by the LEDs will not directly transmit the cover without reflection by the first and second reflective surfaces.

The heat generated during operation of the first and second LED modules can directly be transmitted to the first and second mounting portions of the housing and then transmitted to the fins on the housing, providing a better heat dissipating effect. Furthermore, the lamp seat can include different patterns on the front face to provide wider applications.

The present invention will become clearer in light of the following detailed description of illustrative embodiments of this invention described in connection with the drawings.

DETAILED DESCRIPTION OF THE INVENTION

With reference to FIGS. 1-5, a vehicular light-emitting diode (LED) lamp according to the present invention includes a housing 1, a reflective member 2, a cover 3, a circuit board unit 4, a lamp seat 5, and first and second light-emitting diodes 6 and 7. The housing 1 includes a compartment 11 in a central portion thereof. The compartment 11 has an opening 12 in a front end of the housing 1. A recessed portion 13 extends rearward from a bottom wall of the compartment 11. First and second mounting portions 14 extend from the bottom wall to the opening 12 of the compartment 11 and are located on opposite sides of the recessed portion 13. Each of the first and second mounting portions 14 of the housing 1 includes at least one fixing hole 141. The first and second mounting portions 14 of the housing 1 are located on the same horizontal line. The housing 1 further includes a plurality of fins 15 on an outer side thereof. The housing 1 includes an engagement groove 121, a notch 122, and a lug 123 at the opening 12 of the housing 1, with the notch 122 located on an inner side of the engagement groove 121.

The reflective member 2 is mounted in the compartment 11 of the housing 1. The reflective member 2 includes a concave inner side having an opening 21 in a front end of the reflective member 2. The reflective member 2 includes a partitioning section 22 corresponding to a position of the first and second mounting portions 14 of the housing 1. The concave inner side of the reflective member 2 includes first and second reflective surfaces 23 and 24 having different reflective conditions. The partitioning section 22 is located between the first and second reflective surfaces 23 and 24. The partitioning section 22 includes first and second lateral portions 221 respectively engaged with the first and second mounting portions 14 of the housing 1. The partitioning section 22 further includes a central portion 222 between the first and second lateral portions 221. The central portion 222 of the reflective member 2 is aligned with the recessed portion 13 of the housing 1 and extends from a bottom of the reflective member 2 to the opening 21 of the reflective member 2. The central portion 222 of the reflective member 2 includes a slot 223 in a center thereof. Each of the first and second lateral portions 221 of the partitioning section 22 of the reflective member 2 includes a through-slot 224. The reflective member 2 includes an ear 211 on an outer side of the opening 21 of the reflective member 2.

The cover 3 is mounted in front of the opening 21 of the reflective member 2 and is transmittable to light. The cover 3 includes a lip 31 for coupling with the engagement groove 121 of the housing 1 and a coupling member 32 for coupling with the lug 123 of the housing 1. When the reflective member 2 is mounted in the compartment 11 of the housing 1, the ear 211 is engaged in the notch 122 of the housing 1. When the cover 3 is mounted to the housing 1, the lip 31 is engaged in the engagement groove 121 of the housing 1 and presses against the ear 211, and the coupling member 32 engages with the lug 123 of the housing 1.

The circuit board unit 4 is mounted in the housing 1 and is adapted to be electrically connected by wires 41 to an external electric component. The circuit board unit 4 is received in the recessed portion 13 of the housing 1 and the slot 223 of the reflective member 2.

The lamp seat 5 is mounted in front of the partitioning section 22 of the reflective member 2. The lamp seat 5 includes two sides each having a transverse coupling portion 51. The transverse coupling portions 51 are respectively located in front of the first and second lateral portions 221 of the partitioning section 22. Each transverse coupling portion 51 has a projection 511 protruding rearward from a rear face of the transverse coupling portion 51. Each projection 511 is aligned with the through-slot 224 of one of the first and second lateral portions 221 of the partitioning section 22. Each projection 511 includes at least one fixing hole 512 aligned with the at least one fixing hole 141 of one of the first and second lateral portions 221 of the partitioning section 22 of the reflective member 2. The projection 511 of each transverse coupling portion 51 engages with the through-slot 224 of one of the first and second lateral portions 221 of the partitioning section 22 of the reflective member 2 when the lamp seat 5 is mounted in front of the partitioning section 22 of the reflective member 2, with each projection 511 abutting one of the first and second mounting portions 14 of the housing 1. A fastener 8 extends through each fixing hole 512 of the lamp seat 5 and one of the fixing holes 141 of the housing 1. Thus, the lamp seat 5 is reliably fixed in front of the reflective member 2. The projections 511 of the lamp seat 5 abut the first and second mounting portions 14 of the housing 1 to provide a direct heat conducting effect.

The lamp seat 5 further includes two vertical coupling portions 52 between the transverse coupling portions 51. Each vertical coupling portion 52 includes an engagement section 521, 522. The engagement sections 521 and 522 respectively face the first and second reflective surfaces 23 and 24 of the reflective member 2. Each vertical coupling portion 52 of the lamp seat 5 includes a front face having a decorative pattern, such as the trademark of a vehicle to which the vehicular LED lamp is mounted.

The first and second light-emitting diode (LED) modules 6 and 7 are respectively mounted to the engagement sections 521 and 522 of the lamp seat 5. The first LED module 6 includes an ELD 61 adapted to emit light beams towards a rear and a side of the first reflective surface 23. The second LED module 7 includes an LED 71 adapted to emit light beams towards a rear and a side of the second reflective surface 24. The first and second LED modules 6 and 7 are electrically connected to the circuit board unit 4. The first LED module 6 includes a shield 62 adapted to block light beams emitted from the LED 61 of the first LED module 6 towards the partitioning section 22 of the reflective member 2.

Figure 1:
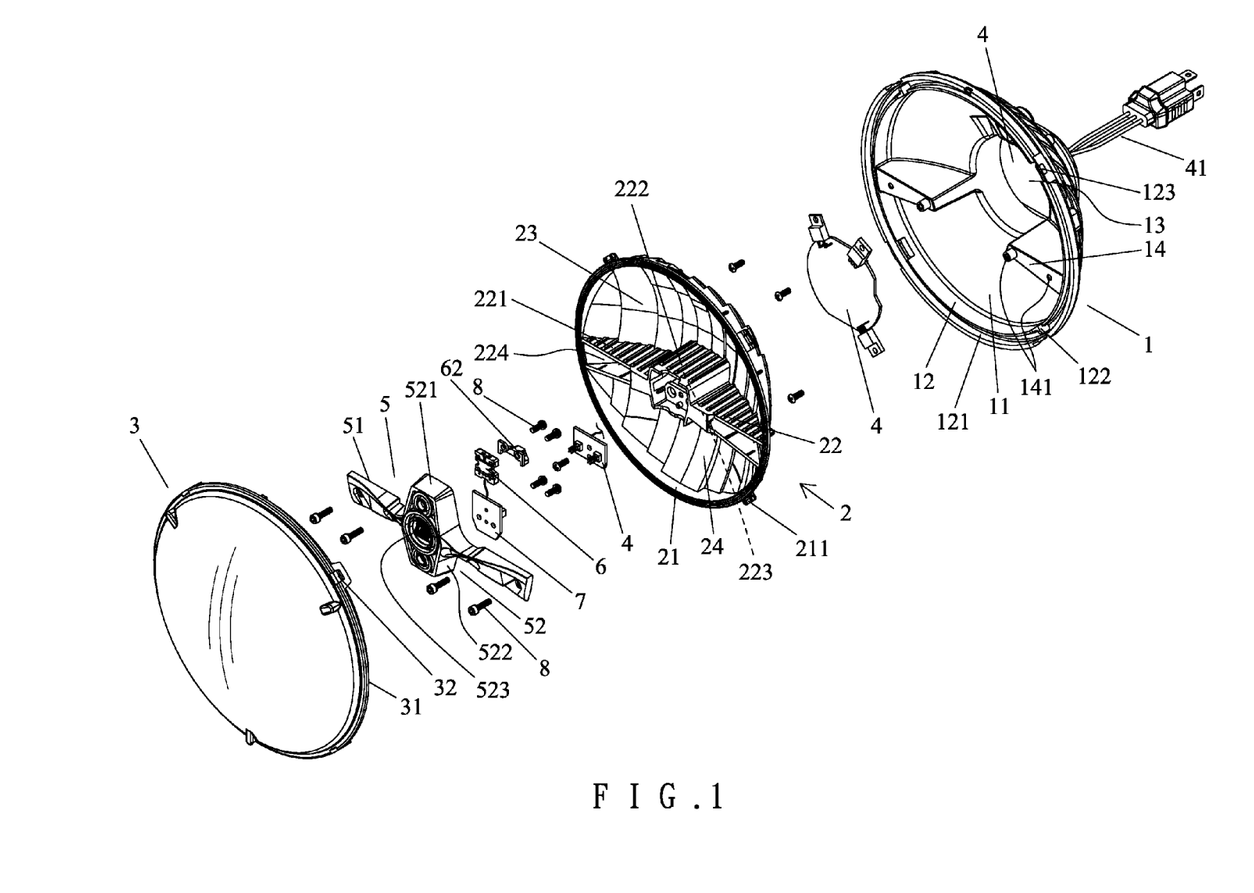
FIG. 1 is an exploded, perspective view of a vehicular LED lamp according to the present invention.
Figure 2:
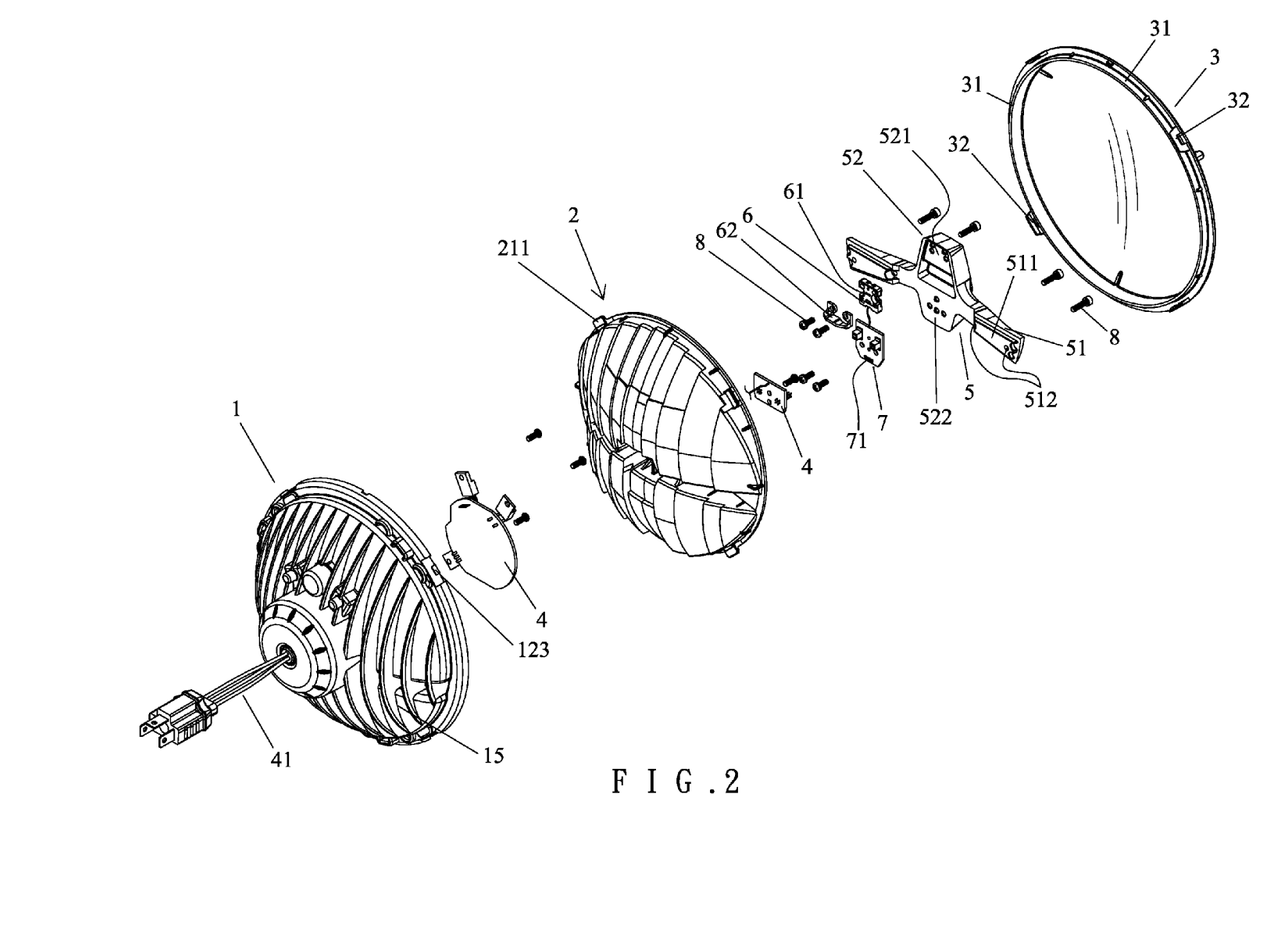
FIG. 2 is another exploded, perspective view of the vehicle LED lamp of FIG. 1.
Figure 3:
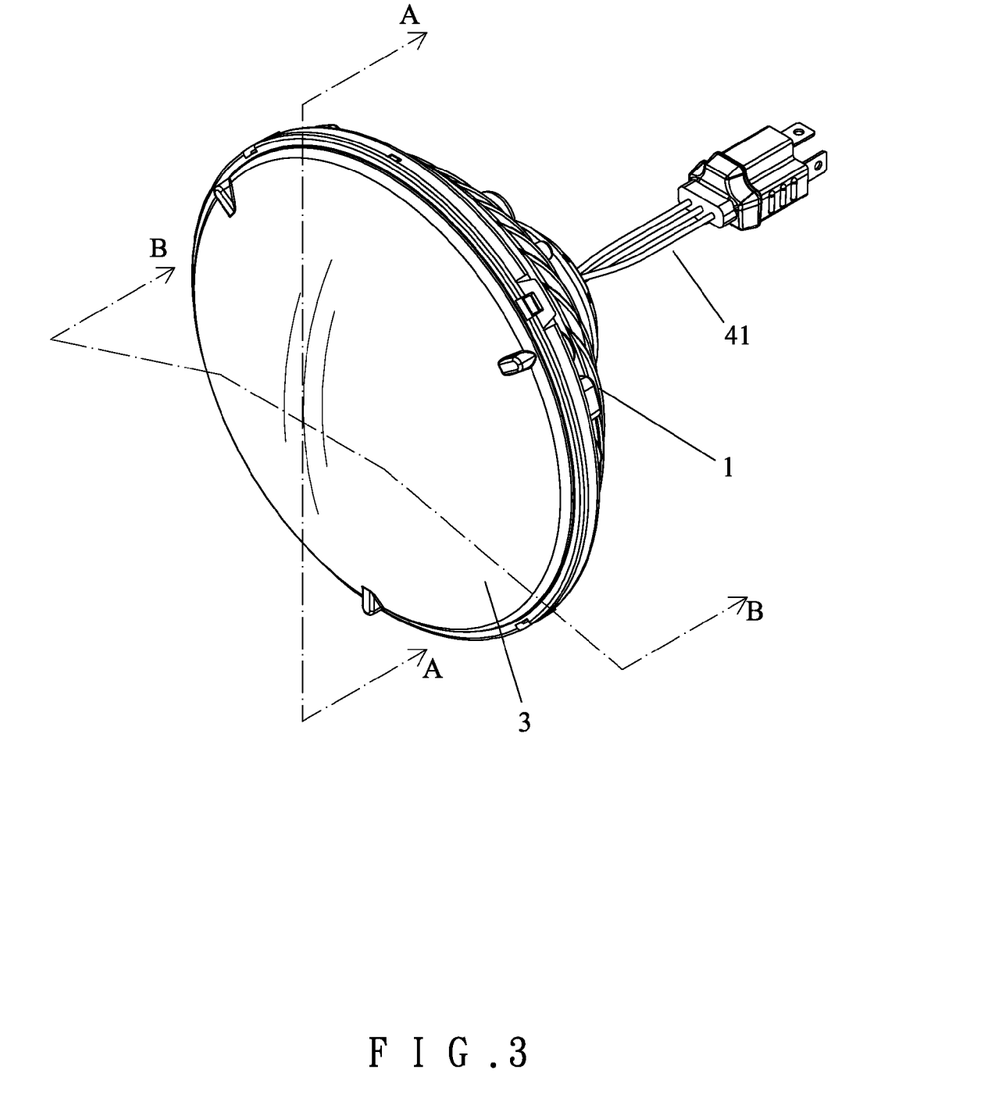
FIG. 3 is a perspective view of the vehicular LED lamp of FIG. 1.
Figure 4:
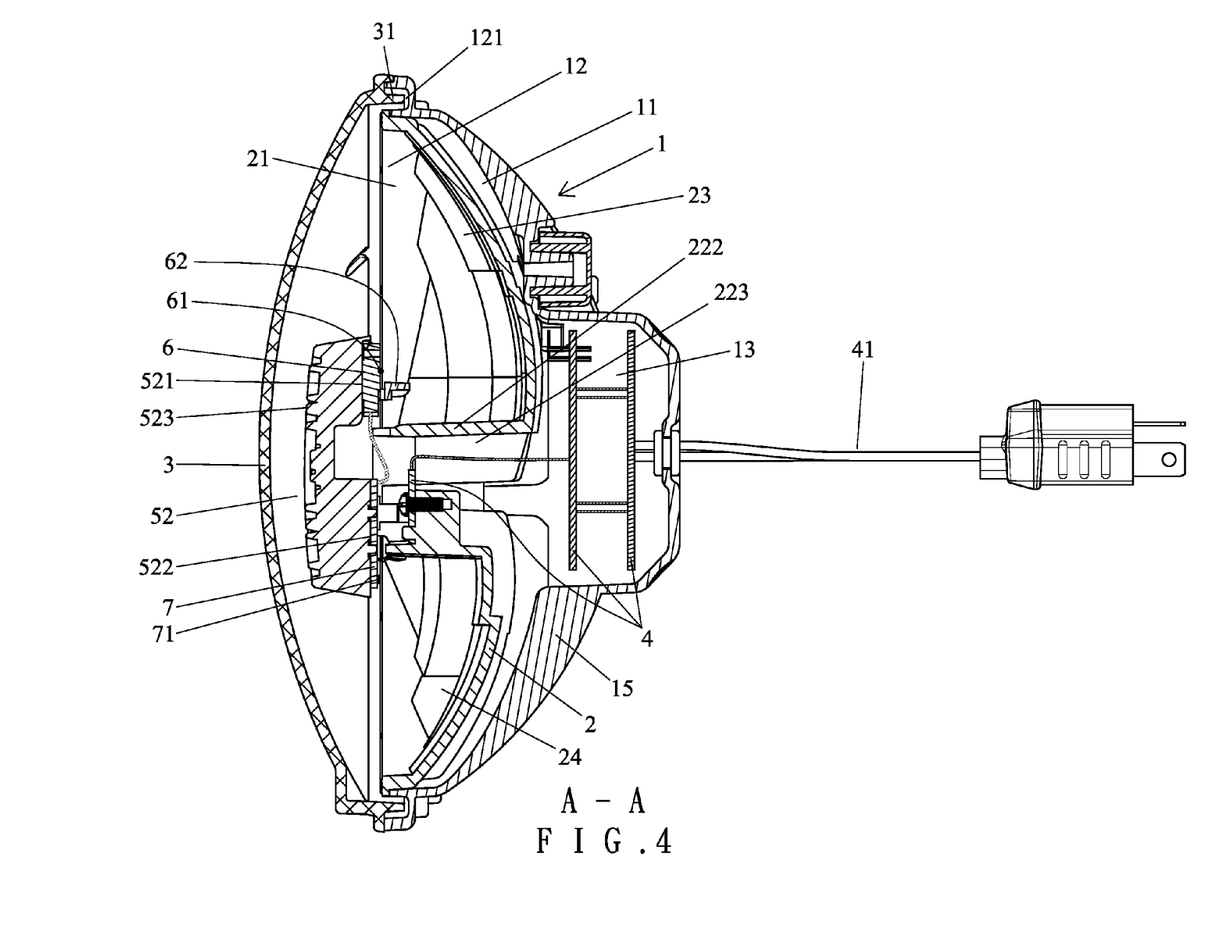
FIG. 4 is a cross sectional view taken along section line A-A of FIG. 3.
Figure 5:
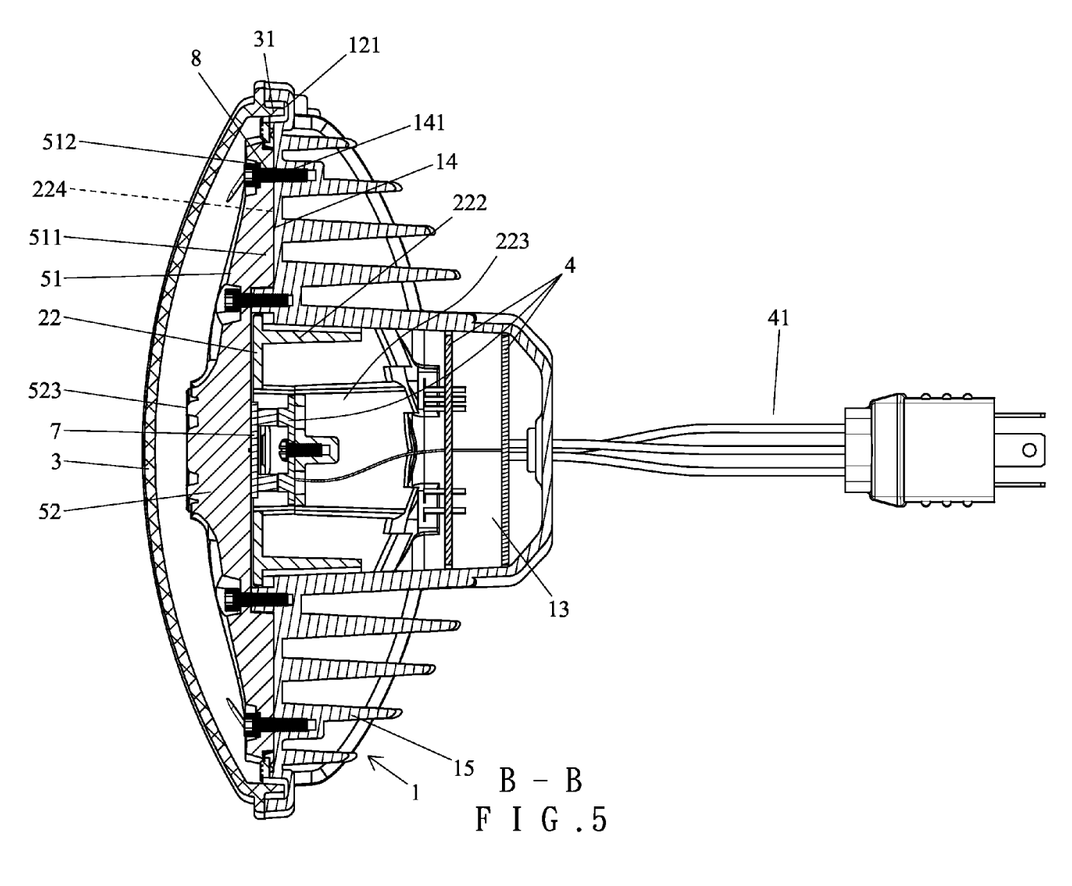
FIG. 5 is a cross sectional view taken along section line B-B of FIG. 3.
Figure 6:
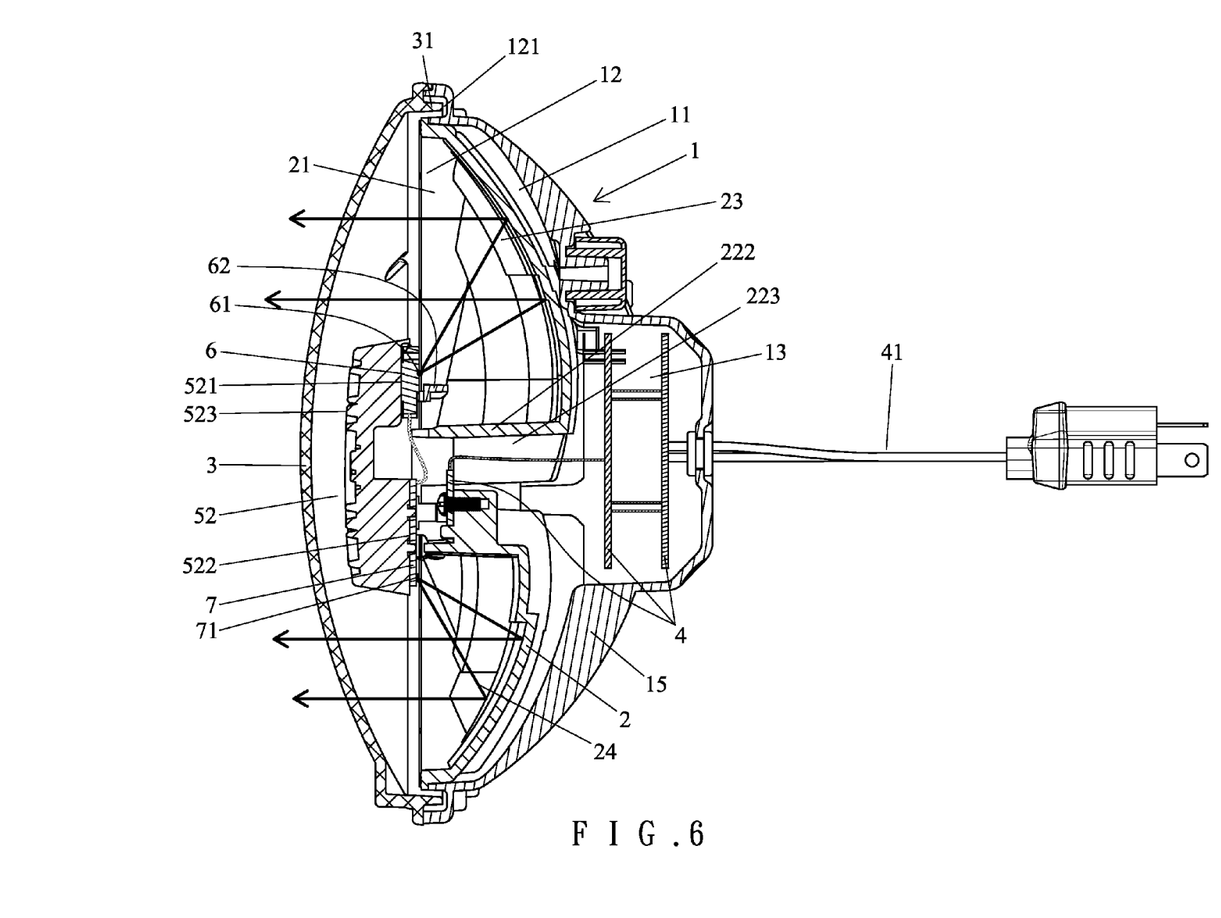
FIG. 6 is a view similar to FIG. 3, illustrating lighting of the vehicular LED lamp of FIG. 1.

With reference to FIG. 6, when the first and second LED modules 6 and 7 operate, the LED 61 emits light beams towards the rear and the side of the first reflective surface 23, and the LED 71 emits light beams towards the rear and the side of the second reflective surface 24. The light beams are reflected by the first and second reflective surfaces 23 and 24 to produce high beam or low beam. The front ends of the LEDs 61 and 71 are directly blocked by the lamp seat 5 such that the light beams emitted by the LEDs 61 and 71 will not directly transmit the cover 3 without reflection by the first and second reflective surfaces 23 and 24.

The heat generated during operation of the first and second LED modules 6 and 7 can directly be transmitted to the first and second mounting portions 14 of the housing 1 and then transmitted to the fins 15 on the housing 1, providing a better heat dissipating effect. Furthermore, the lamp seat 5 can include different patterns on the front face 523 to provide wider applications.

Although specific embodiments have been illustrated and described, numerous modifications and variations are still possible without departing from the scope of the invention. The scope of the invention is limited by the accompanying claims.

The invention claimed is:

1. A vehicular light-emitting diode lamp comprising:
a housing including a compartment in a central portion thereof, with the compartment having an opening in a front end of the housing, with the compartment having a bottom wall, with a recessed portion extending rearward from the bottom wall of the compartment, with first and second mounting portions extending from the bottom wall to the opening of the compartment and located on opposite sides of the recessed portion;
a reflective member mounted in the compartment of the housing, with the reflective member including a concave inner side having an opening in a front end of the reflective member, with the concave inner side of the reflective member including first and second reflective surfaces having different reflecting conditions, with the reflective member further including a partitioning section located between the first and second reflective surfaces, with the partitioning section including first and second lateral portions respectively engaged with the first and second mounting portions of the housing, with the partitioning section further including a central portion between the first and second lateral portions of the partitioning section;
a cover mounted in front of the opening of the reflective member, with the cover being transmittable to light;
a circuit board unit mounted in the housing and adapted to be electrically connected to an external electric component;
a lamp seat mounted in front of the partitioning section of the reflective member, with the lamp seat including two sides each having a transverse coupling portion, with the transverse coupling portions respectively located in front of the first and second lateral portions, with the lamp seat further including two vertical coupling portions between the transverse coupling portions, with each of the two vertical coupling portions including an engagement section, with the engagement sections respectively facing the first and second reflective surfaces of the reflective member; and
first and second light-emitting diode (LED) modules respectively mounted to the engagement sections of the lamp seat, with the first LED module including an LED adapted to emit light beams towards a rear and a side of the first reflective surface, with the second LED module including an LED adapted to emit light beams towards a rear and a side of the second reflective surface, with the first and second LED modules electrically connected to the circuit board unit.

2. The vehicular light-emitting diode lamp as claimed in claim 1, with each of the first and second mounting portions of the housing including a fixing hole, with the housing further including a plurality of fins on an outer side thereof, with each of the first and second lateral portions of the partitioning section of the reflective member including a through-slot, with each transverse coupling portion having a projection protruding rearward from a rear face of the transverse coupling portion, with each projection including a fixing hole aligned with the fixing hole of one of the first and second lateral portions of the partitioning section of the reflective member, with the projection of each transverse coupling portion engaged in the through-slot of one of the first and second lateral portions of the partitioning section of the reflective member, with each projection abutting one of the first and second mounting portions of the housing, with a fastener extending through the fixing hole of the lamp seat and the fixing hole of the housing.

3. The vehicular light-emitting diode lamp as claimed in claim 2, with the first and second mounting portions of the housing located on a same horizontal line.

4. The vehicular light-emitting diode lamp as claimed in claim 2, with the housing including an engagement groove, a notch, and a lug at the opening of the housing, with the notch located on an inner side of the engagement groove, with the reflective member including an ear on an outer side of the opening of the reflective member, with the ear of the reflective member engaged in the notch of the housing, with the cover including a lip engaged in the engagement groove of the housing, with the cover further including a coupling member engaged with the lug of the housing.

5. The vehicular light-emitting diode lamp as claimed in claim 2, with each of the two vertical coupling portions of the lamp seat including a front face having a decorative pattern.

6. The vehicular light-emitting diode lamp as claimed in claim 2, with the central portion of the reflective member aligned with the recessed portion of the housing, with the central portion of the reflective member extending from a bottom of the reflective member to the opening of the reflective member, with the central portion of the reflective member including a slot, with the circuit board unit received in the recessed portion of the housing and the slot of the reflective member.

7. The vehicular light-emitting diode lamp as claimed in claim 2, with the first LED module including a shield, with the shield adapted to block light beams emitted from the LED of the first LED module towards the partitioning section of the reflective member.

* * * * *